United States Patent
Omari

(10) Patent No.: US 12,446,040 B2
(45) Date of Patent: Oct. 14, 2025

(54) INTERLEAVED CONTROL CHANNEL ELEMENT TO RESOURCE ELEMENT GROUP MAPPING

(71) Applicant: Apple Inc., Cupertino, CA (US)

(72) Inventor: Hamzeh Omari, San Diego, CA (US)

(73) Assignee: Apple Inc., Cupertino, CA (US)

( * ) Notice: Subject to any disclaimer, the term of this patent is extended or adjusted under 35 U.S.C. 154(b) by 655 days.

(21) Appl. No.: 17/883,497

(22) Filed: Aug. 8, 2022

(65) Prior Publication Data
US 2023/0100598 A1    Mar. 30, 2023

Related U.S. Application Data
(60) Provisional application No. 63/248,292, filed on Sep. 24, 2021.

(51) Int. Cl.
*H04W 72/21*      (2023.01)
*H04L 1/00*       (2006.01)
(Continued)

(52) U.S. Cl.
CPC .......... *H04W 72/21* (2023.01); *H04L 1/0071* (2013.01); *H04L 1/04* (2013.01); *H04W 72/121* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2010/0197302 A1* | 8/2010 | Chen | ............ H04W 99/00 455/434 |
| 2018/0359755 A1 | 12/2018 | Sun et al. | |

(Continued)

FOREIGN PATENT DOCUMENTS

| | | |
|---|---|---|
| WO | WO 2018144852 | 8/2018 |
| WO | WO 2018228555 | 12/2018 |

OTHER PUBLICATIONS

[Unknown Author], "3rd Generation Partnership Project; Technical Specification Group Radio Access Network; Evolved Universal Terrestrial Radio Access (E-UTRA); Physical channels and modulation (Release 15)," 3GPP TS 36.211 V15.7.0, Sep. 2019, 239 pages.

(Continued)

*Primary Examiner* — Jutai Kao
(74) *Attorney, Agent, or Firm* — Fish & Richardson P.C.

(57) ABSTRACT

Systems and methods for de-interleaving a data of a plurality of Resource Element Groups (REGs) and construct one or more control channel elements (CCEs) in accordance with a CCE to REG mapping include performing operations comprising: obtaining a CCE-to-REG mapping comprising a mapping parameter value for each of one or more mapping parameters; obtaining an interleaved data transmission specifying a Control Resource Set (CORESET); selecting a first CCE, of a set of CCEs, for assembly; for the first CCE: assigning a REG bundle of the interleaved data transmission to the first CCE based on an index value of the REG bundle and the mapping parameter value; extracting the REG bundle of the index value to a memory; and combining the extracted REG bundle with any existing extracted REG bundles to generate an assembled CCE in the memory.

20 Claims, 8 Drawing Sheets

(51) Int. Cl.
    *H04L 1/04*           (2006.01)
    *H04W 72/121*      (2023.01)
    *H04W 72/232*      (2023.01)

(56) References Cited

U.S. PATENT DOCUMENTS

| | | | | |
|---|---|---|---|---|
| 2018/0368116 | A1* | 12/2018 | Liao | H04W 76/27 |
| 2020/0245332 | A1* | 7/2020 | Ji | H04L 1/0071 |
| 2021/0314114 | A1* | 10/2021 | Seo | H04L 1/0071 |
| 2023/0354366 | A1* | 11/2023 | Xue | H04W 72/232 |
| 2024/0072855 | A1* | 2/2024 | Papasakellariou | H04L 25/023 |

OTHER PUBLICATIONS

[Unknown Author], "3rd Generation Partnership Project; Technical Specification Group Radio Access Network; NR; Multiplexing and channel coding (Release 15)," 3GPP TS 38.212 V15.7.0, Sep. 2019, 101 pages.

[Unknown Author], "3rd Generation Partnership Project; Technical Specification Group Radio Access Network; Evolved Universal Terrestrial Radio Access (E-UTRA); Radio Resource Control (RRC); Protocol specification (Release 15),"3GPP TS 36.331 v v15.7.0 Release 15. Sep. 2019, 962 pages.

[Unknown Author], 3rd Generation Partnership Project; Technical Specification Group Services and System Aspects; Release 16 Description; Summary of Rel-16 Work Items (Release 16), 3GPP TR 21.916 V0.2.0, Dec. 2019, 26 pages.

[Unknown Author], "3rd Generation Partnership Project; Technical Specification Group Radio Access Network; Evolved Universal Terrestrial Radio Access (E-UTRA); User Equipment (UE) radio transmission and reception (Release 15)," 3GPP TS 36.101 V15.3.0, Oct. 2018, 1696 pages.

[Unknown Author], "3rd Generation Partnership Project; Technical Specification Group Radio Access Network; NR; Physical channels and modulation (Release 15)," 3GPP TS 38.211 v15.7.0, Sep. 2019, 97 pages.

Extended European Search Report in European Appln. No. 22195626, dated Feb. 1, 2023, 9 pages.

Huawei et al., "CCE-to-REG Mapping," 3GPP TSG RAN WG1 NR Ad-Hoc Meeting, R1-1711413, Qingdao, China, Jun. 27-30, 2017, 12 pages.

* cited by examiner

| c | r | x=cR+r | f(x) | Parameter | Value |
|---|---|---|---|---|---|
| 0 | 0 | 0 | 0 | $N_{RB}^{CORESET}$ | 12 |
| 0 | 1 | 1 | 4 | $N_{sym}^{CORESET}$ | 2 |
| 0 | 2 | 2 | 8 | $N_{REG}^{CORESET}$ | 24 |
| 1 | 0 | 3 | 1 | n_shift | 0 |
| 1 | 1 | 4 | 5 | L | 2 |
| 1 | 2 | 5 | 9 | R | 3 |
| 2 | 0 | 6 | 2 | C | 4 |
| 2 | 1 | 7 | 6 | freqDomainRes | 0001000 0100000 0000000 0000000 0000000 0000000 0000 |
| 2 | 2 | 8 | 10 | N_cce | 4 |
| 3 | 0 | 9 | 3 | | |
| 3 | 1 | 10 | 7 | | |
| 3 | 2 | 11 | 11 | | |

Figure 5C

INTERLEAVED CONTROL CHANNEL ELEMENT TO RESOURCE ELEMENT GROUP MAPPING

CLAIM OF PRIORITY

This application claims priority under 35 U.S.C. § 119(e) to U.S. Patent Application Ser. No. 63/248,292, filed on Sep. 24, 2021, the entire contents of which are hereby incorporated by reference.

TECHNICAL FIELD

This disclosure relates generally to wireless communications.

BACKGROUND

For fifth generation (5G) new radio (NR) networks, resource allocation is performed using a Control Resource Set (CORESET). Generally, in Long Term Evolution (LTE) networks, control channels are allocated across the entire system bandwidth. This makes it difficult to control the inter-cell interference. To address this issue, in 5G NR systems, physical downlink control channels (PDCCHs) transmit in a specifically designed CORESET. The CORESET is analogous to an LTE control region, but is generalized with a set of resource blocks (RBs) and orthogonal frequency-division multiplexing (OFDM) symbols. Frequency allocation in CORESET configurations can be contiguous or non-contiguous. In a time domain, the CORESET configuration spans 1 to 3 consecutive OFDM symbols. REs in CORESET are organized in REGs (RE Groups). Each REG consists of 12 REs of one OFDM symbol in one RB.

SUMMARY

This application describes data processing systems and processes for interleaved control channel element (CCE) to resource element group (REG) mapping. Generally, fifth generation (5G) new radio (NR) telecommunications networks support distributed and localized resource allocation for a DCI in a CORESET.

The parameters of CORESET are defined as follows. A resource element (RE) is the smallest unit of a resource grid and includes 1 subcarrier by 1 OFDM symbol. A resource element group (REG) includes 1 resource block (RB) such that there are 12 REs by 1 OFDM symbol. A REG bundles includes multiple REGs. Here, a REG size is specified by a parameter "L". A CCE includes multiple REGs. An aggregation level indicates a number of allocated CCEs for the PDCCH. The number can be 1, 2, 4, 8, or 16. Generally, time domain and frequency domain parameters of CORESET are defined in 3GPP TS 38.211. Radio resource control (RRC) signaling messages include the following fields. The $N_{RB}^{CORESET}$ is a number of RBs in the frequency domain in the CORESET. $N_{Symb}^{CORESET}$ is a number of symbols in time domain in CORESET. $N_{Symb}^{CORESET}$ can be 1, 2, or 3. $N_{REG}^{CORESET}$ is the number of REGs in the CORESET. L is the REG bundle size. Generally, a PDCCH channel is confined to one CORESET and transmitted with its own DMRS (Demodulation Reference Signal). User equipment (UE)-specific beamforming of the control channel can be performed. The PDCCH channel is carried by 1, 2, 4, 8, or 16 CCEs to carry various DCI payload sizes or coding rates. Each CCE includes 6 REGs. The CCE to REG mapping for CORESET can be interleaved (to support frequency diversity) or non-interleaved (for localized beamforming). For interleaved CCE-to-REG mapping, the CCEs are broken down into scattered REG bundles in the frequency domain. A REG bundle is a set of indivisible resources consisting of neighboring REGs. The REG bundle spans across all OFDM symbols for the given CORESET. The interleaved CCE-to-REG mapping enables both a time domain processing gain and frequency domain diversity The systems and processes described in this document enable one or more of the following advantages, among other advantages. As previously described, the data processing system (e.g., one or more portions of one or more of a UE or base station) is configured to perform REG de-interleave functions in the NR PDCCH. The REG bundles constituting a CCE are obtained using a block interleaver to spread out the different REG bundles in frequency, thereby obtaining frequency diversity. The data processing system described herein is configured to be more flexible than existing hardware (HW) instructions. For example, a DECIMATE function is not flexible enough to handle the different interleave configurations warranting different REG block sizes to extract and different distances between the extracted blocks to aggregate and construct the CCE. The processes described herein perform de-interleave in a firmware or in the hardware using basic, available instructions without the need for special HW instructions. The process includes a de-interleave of the REGs in both a time domain and a frequency domain. The process includes a de-interleave on a symbol boundary instead of a CORESET duration boundary. The data processing system is configured to initiate a de-interleave earlier in a timeline than can be performed with, for example, DECIMATE or similar functions. The data processing system is configured to de-interleave one symbol at a time, improving a processing timeline by requiring fewer iterations over different frequency bands. The data processing system is configured to aggregate the de-interleaved REGs to comply with 4-byte restrictions when writing to memory. Extraction does not need to be REG aligned. Because extraction can extend to multiple REGs per the CORESET configuration, the extraction can be reduced to a fraction of the time than if extraction is required to be REG aligned and does not extend to multiple REGs per the CORESET. The extraction size is defined as a size of the REG block being equal to a number of PDCCH bits per RB x*L divided by the duration.

The disclosed techniques are realized by one or more implementations, which are subsequently described in an Examples section.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

FIG. 5C shows the mapping table generated from these parameter values.

Like reference symbols in the various drawings indicate like elements.

DETAILED DESCRIPTION

Figure 1:
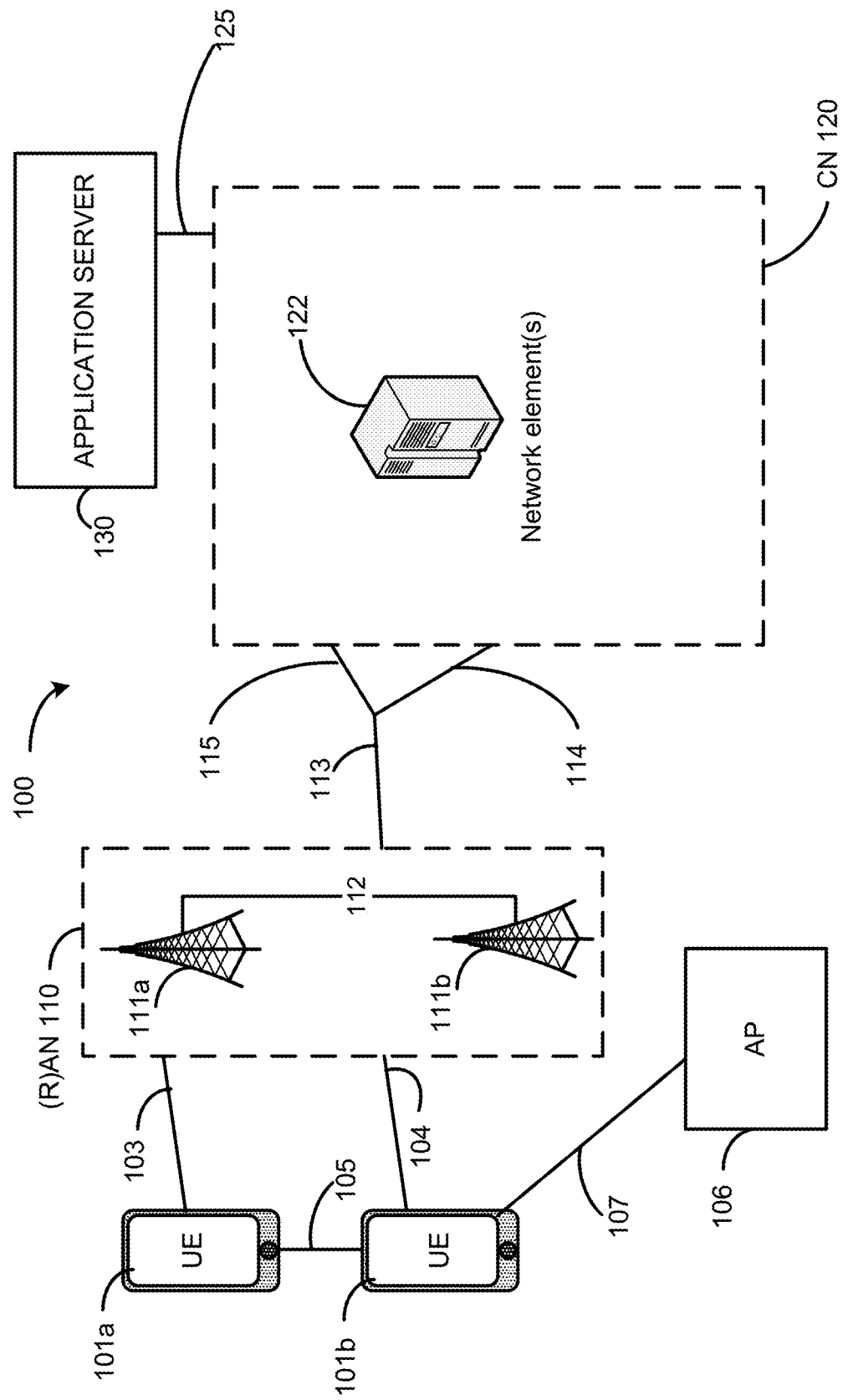
FIG. 1 illustrates an example wireless communication system, according to various implementations herein.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

The UEs 101 may be configured to connect, for example, communicatively couple, with RAN 110. In implementations, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G or 5G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various implementations, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G or 5G system 100 (e.g., a gNB). According to various implementations, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 111 may be implemented as one or more software entities running on server computers as part of a virtual network, which may be referred to as a CRAN and/or a virtual baseband unit pool (vBBUP). In these implementations, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In implementations, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the implementations is not limited in this respect. The OFDM signals can comprise a plurality of orthogonal sub carriers.

In some implementations, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various implementations, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101$b$ within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations may use concepts for resource allocation for control channel information that are an extension of the above-described concepts. For example, some implementations may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In implementations where the system 100 is an LTE system, the interface 112 may be an X2 interface 112. The X2 interface may be defined between two or more RAN nodes 111 (e.g., two or more gNBs and the like) that connect to EPC 120, and/or between two gNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between gNBs.

In implementations where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two gNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network-in this implementation, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In implementations, the CN 120 may be a 5GC (referred to as "5GC 120" or the like), and the RAN 110 may be connected with the CN 120 via an NG interface 113. In implementations, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In implementations, the CN 120 may be a 5G CN (referred to as "5GC 120" or the like), while in other implementations, the CN 120 may be an EPC). Where CN 120 is an EPC (referred to as "EPC 120" or the like), the RAN 110 may be connected with the CN 120 via an S1 interface 113. In implementations, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
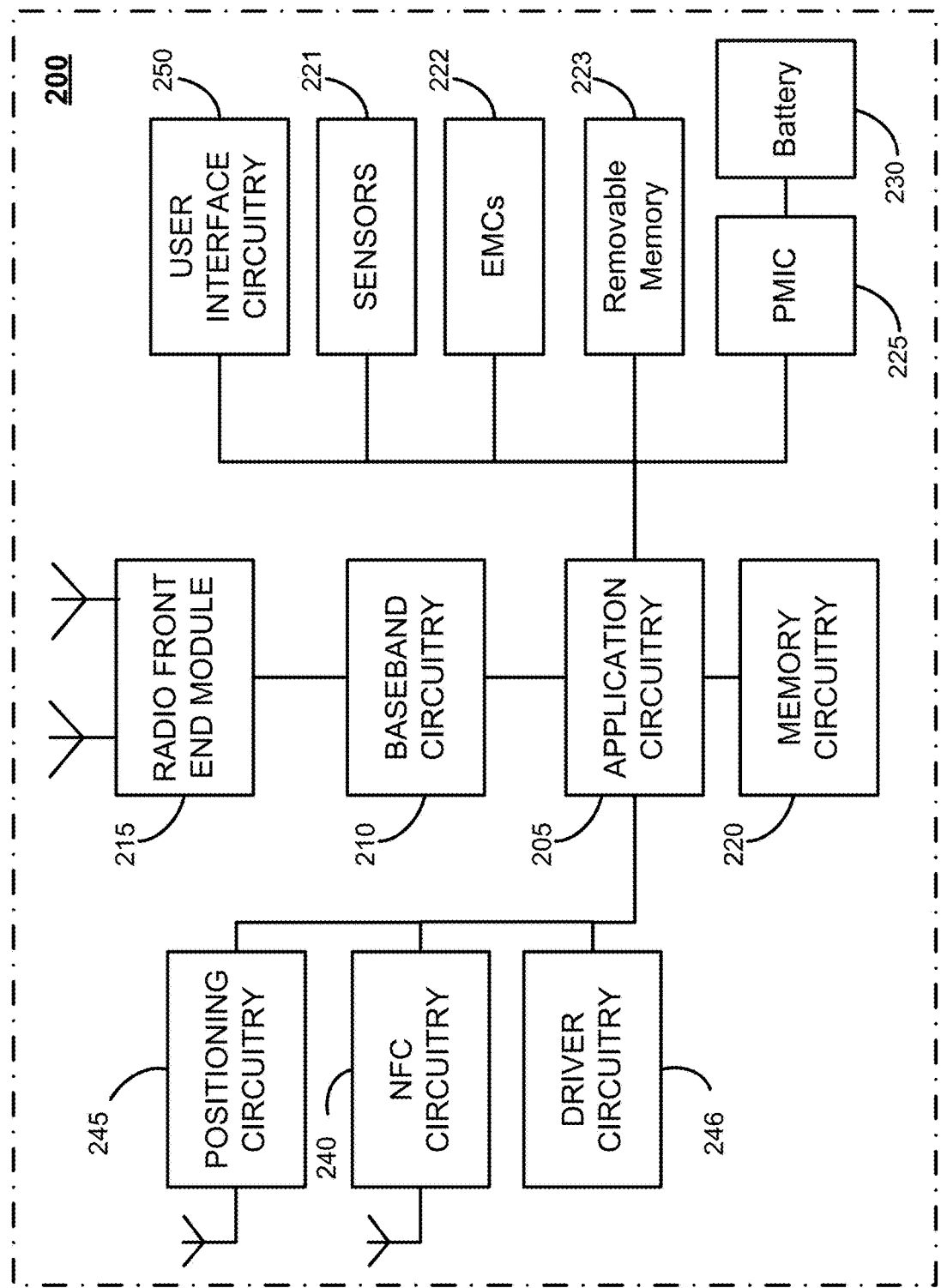
FIG. 2 illustrates an example of a computing device in accordance with various implementations.

FIG. 2 illustrates an example of a platform 200 (or "device 200") in accordance with various implementations. In implementations, the computer platform 200 may be suitable for use as UEs 101, application servers, and/or any other element/device discussed herein. The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The block diagram of FIG. 2 is intended to show a high level view of components of the computer platform 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry may comprise, or may be, a special-purpose processor/controller to operate according to the various implementations herein.

As examples, the processor(s) of application circuitry 205 may include an Apple A-series processor. The processors of the application circuitry 205 may also be one or more of an Intel® Architecture Core™ based processor, such as a Quark™, an Atom™ an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a system on a chip (SoC) in which the application circuitry 205 and other components are formed into a single integrated circuit.

Additionally or alternatively, application circuitry 205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like.

The baseband circuitry 210 may be implemented, for example, as a solder-down substrate including one or more integrated circuits, a single packaged integrated circuit soldered to a main circuit board or a multi-chip module containing two or more integrated circuits.

The RFEMs 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc.

Removable memory circuitry 223 may include devices, circuitry, enclosures/housings, ports or receptacles, etc. Used to couple portable data storage devices with the platform 200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 200 may also include interface circuitry (not shown) that is used to connect external devices with the platform 200. The external devices connected to the platform 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable platform 200 to change its state, position, and/or orientation, or move or control a mechanism or (sub)system. Additionally, EMCs 222 may be configured to generate and send messages/signaling to other components of the platform 200 to indicate a current state of the EMCs 222.

In some implementations, the interface circuitry may connect the platform 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like.

In some implementations, the interface circuitry may connect the platform 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the platform 200 (e.g., an "NFC touchpoint").

The driver circuitry 246 may include software and hardware elements that operate to control particular devices that are embedded in the platform 200, attached to the platform 200, or otherwise communicatively coupled with the platform 200. The driver circuitry 246 may include individual drivers allowing other components of the platform 200 to interact with or control various input/output (I/O) devices that may be present within, or connected to, the platform 200.

The power management integrated circuitry (PMIC) 225 (also referred to as "power management circuitry 225") may manage power provided to various components of the platform 200. In particular, with respect to the baseband circuitry 210, the PMIC 225 may control power-source selection, voltage scaling, battery charging, or DC-to-DC conversion. The PMIC 225 may often be included when the platform 200 is capable of being powered by a battery 230.

In some implementations, the PMIC 225 may control, or otherwise be part of, various power saving mechanisms of the platform 200. For example, if the platform 200 is in an RRC_Connected state, where it is still connected to the RAN node as it expects to receive traffic shortly, then it may enter a state known as Discontinuous Reception Mode (DRX) after a period of inactivity. During this state, the platform 200 may power down for brief intervals of time and thus save power. If there is no data traffic activity for an extended period of time, then the platform 200 may transition off to an RRC Idle state, where it disconnects from the network and does not perform operations such as channel quality feedback, handover, etc. The platform 200 goes into a very low power state and it performs paging where again it periodically wakes up to listen to the network and then powers down again. The platform 200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 230 may power the platform 200, although in some examples the platform 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in V2X applications, the battery 230 may be a typical lead-acid automotive battery.

A power block, or other power supply coupled to an electrical grid may be coupled with the BMS to charge the battery 230. In some examples, a power block may be replaced with a wireless power receiver to obtain the power wirelessly, for example, through a loop antenna in the computer platform 200.

User interface circuitry 250 includes various input/output (I/O) devices present within, or connected to, the platform 200, and includes one or more user interfaces designed to enable user interaction with the platform 200 and/or peripheral component interfaces designed to enable peripheral component interaction with the platform 200.

Figure 3:
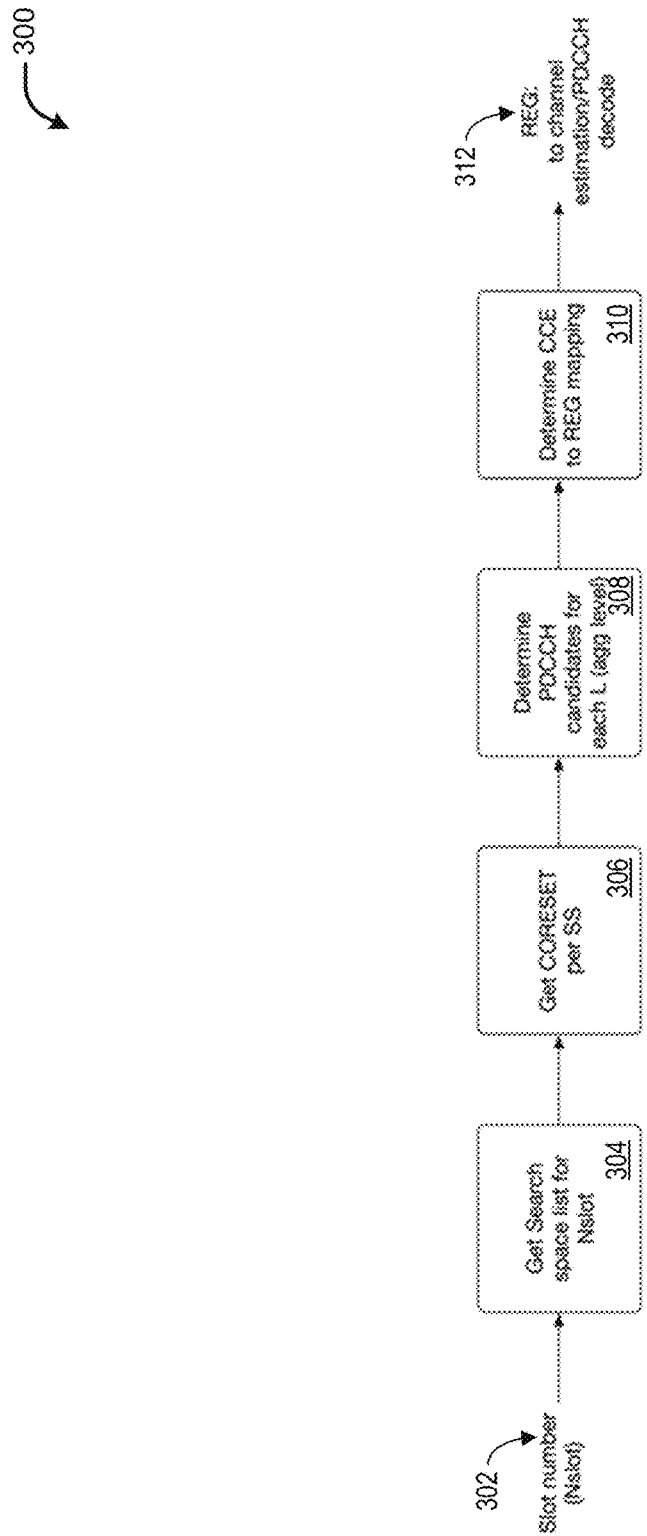
FIG. 3 illustrates an example process for interleaved control channel element to resource element group mapping in accordance with some implementations of the present disclosure.

FIG. 3 illustrates an example process 300 for interleaved control channel element to resource element group mapping in accordance with some implementations of the present disclosure. Generally, a UE can be configured to de-interleave the REG bundles to build CCEs. A base station (e.g., a next generation node, or gNB) is configured to interleave the REG bundles using the CCE to REG mapping.

The process 300 for NR PDCCH flow and CORESET configuration is defined by a number of parameters. These parameters set the search space (SS) and are used to determine how the CCE to REG mapping is configured. Generally, the RRC signaling message parameters defining the CORESET include the following parameters. The parameter controlResourceSetId corresponds to a Layer 1 parameter CORESET-ID. A value of the CORESET ID is equal to 0 identifies a common CORESET configured in a master information block (MIB) and in ServingCellConfigCommon. Non-zero values, such as one up to one less than a value of a maximum number of control resource, each identify CORESETs configured by dedicated signaling. The controlResourceSetId parameter is unique among the bandwidth parts (BWPs) of a serving cell. The parameter frequencyDomainResources represents frequency domain resources. This parameter defines resource blocks within BWP assigned to a UE. The frequency resources parameter corresponds to the Layer 1 parameter CORESET-freq-dom. In the value of the frequency resources parameter, each bit corresponds a group of 6 RBs.

The grouping starts from physical resource block (PRB) 0, which is fully included in the bandwidth part within which the CORESET is configured. The most significant bit in the frequency resources parameter corresponds to the group of lowest frequency which is fully contained in the bandwidth part within which the CORESET is configured. Each next subsequent lower significance bit corresponds to the next lowest frequency group fully contained within the bandwidth part within which the CORESET is configured, if applicable. Generally, bits corresponding to a group that is not fully included within a bandwidth portion within which the CORESET is being configured are set to zero. A duration parameter corresponds to a Layer 1 parameter CORESET-time-duration. The duration parameter defines contiguous time duration in number of symbols for the CORESET. A precoderGranularity parameter specifies a precoder granularity defined in the frequency domain. A tci-StatesPDCCH parameter is a reference to a configured transmission configuration indicator (TCI) state providing quasi-colocation configuration data for PDCCH. A tci-PresentInDCI parameter indicates if a TCI field is present or not present in DL-related DCI. A pdcch-DMRS-ScramblingID parameter indicates a PDCCH DMRS scrambling initialization parameter. If no value is specified, the UE applies the value of physical cell ID configured for the serving cell.

Several parameters are directly related to CCE to REG mapping. A cce-reg-MappingType parameter provides a choice of mapping methods for CCE to REG. A reg-BundleSize parameter represents a number of REGs within a REG bundle, or a number of neighboring REG blocks that are included together. The REG bundle size parameter represents the size of the REG bundles for mapping. An interleaveSize parameter represents a size of each interleaved portion of the mapping. A shiftIndex parameter represents a CORESET shift index. If no value is provided for this parameter, the UE applies a value of a physical cell ID configured for the serving cell.

For NR PDCCH flow and CORESET configuration, a DCI of aggregation level L includes L continuously numbered CCEs. The CCEs are mapped on a number of REGs in a CORESET. The data processing system is configured to enable either distributed resource allocation for a DCI in a CORESET. This is done by configuring interleaved CCE-to-REG mapping for each CORESET. For interleaved CCE-to-REG mapping, REG bundles constituting the CCEs for a PDCCH are distributed in the frequency domain in units of REG bundles. As previously described, a REG bundle is a set of indivisible resources consisting of neighboring REGs. A REG bundle spans across all OFDM symbols for the given CORESET. Therefore, interleaved CCE to REG mapping can enable both a time domain processing gain and frequency domain diversity. Adjacent CCEs for a PDCCH are broken down into scattered REG bundles in the frequency domain. Generally, once the REGs corresponding to a PDCCH are determined, the modulated symbols of the PDCCH are mapped to the REs of the determined REGs in the frequency domain first and the time domain second (e.g., in increasing order of the RE index and symbol index, respectively).

Generally, interleaved mapping calculated at every symbol. After a de-mapping process occurs, the de-interleaved CCE-to-REG mapping is applied to the log-likelihood ratios (LLRs) for a given candidate of a given aggregation level. Generally, for a good channel, the LLR values are saturated clearly indicating a 0 or a 1. The UE applies interleaving to the LLRs generated by the de-mapping. The UE traverses symbols and CORESETs. Thee UE can de-map and de-interleave one symbol at a time instead of waiting for all the symbols for a CORESET to arrive. The UE is configured to calculate and retrieve the parameters needed for the de-interleave process such as calculating the REG block size.

To calculate the interleaved mapping, the values of the mapping parameters are set and combined in an interleaving function. For example, the data processing system calculates a number of resource blocks in the CORESET using the $N_{RB}^{CORESET}$ parameter, which is the number of RBs in the frequency domain in the CORESET, as previously described. Specifically, this value is a number of the count set bits*the number of frequency domain resources*6. $N_{Symb}^{CORESET}$ is a number of symbols in time domain in CORESET. $N_{Symb}^{CORESET}$ can be 1, 2, or 3. $N_{REG}^{CORESET}$ is the number of REGs in the CORESET, which is equal to $N_{RB}^{CORESET} * N_{Symb}^{CORESET}$. L is the REG bundle size. R is the interleaver size. C represents the spacing between RBs in memory for interleaved units, and is a ratio of REGs in the CORESET to the REG bundle size and interleaver size such that $C = N_{REG}^{CORESET}/(LR)$. The interleaved mapping is thus set by the following equation, in which each REG RB is selected as a function of C and R. This interleave de-indexer indicates how interleaved REGs are ordered so that they are read in that order. The UE is configured to read the REG block size and is thus able to process one symbol at a time. More specifically, the REG block size may be different in different scenarios. By reading the REG block size and extracting the REG blocks individually, each symbol is extracted individually and can be aggregated into a CCE as described herein. The calculated interleaved mapping, which selects a number of PRBs for each CCE, is applied to the log-likelihood ratio data store (e.g., the LLR buffer), as described in relation to FIGS. 5-6. The interleaving is applied to the LLRs which are read from the LLR buffer and written back to the LLR buffer after de-interleaving.

Figure 4:
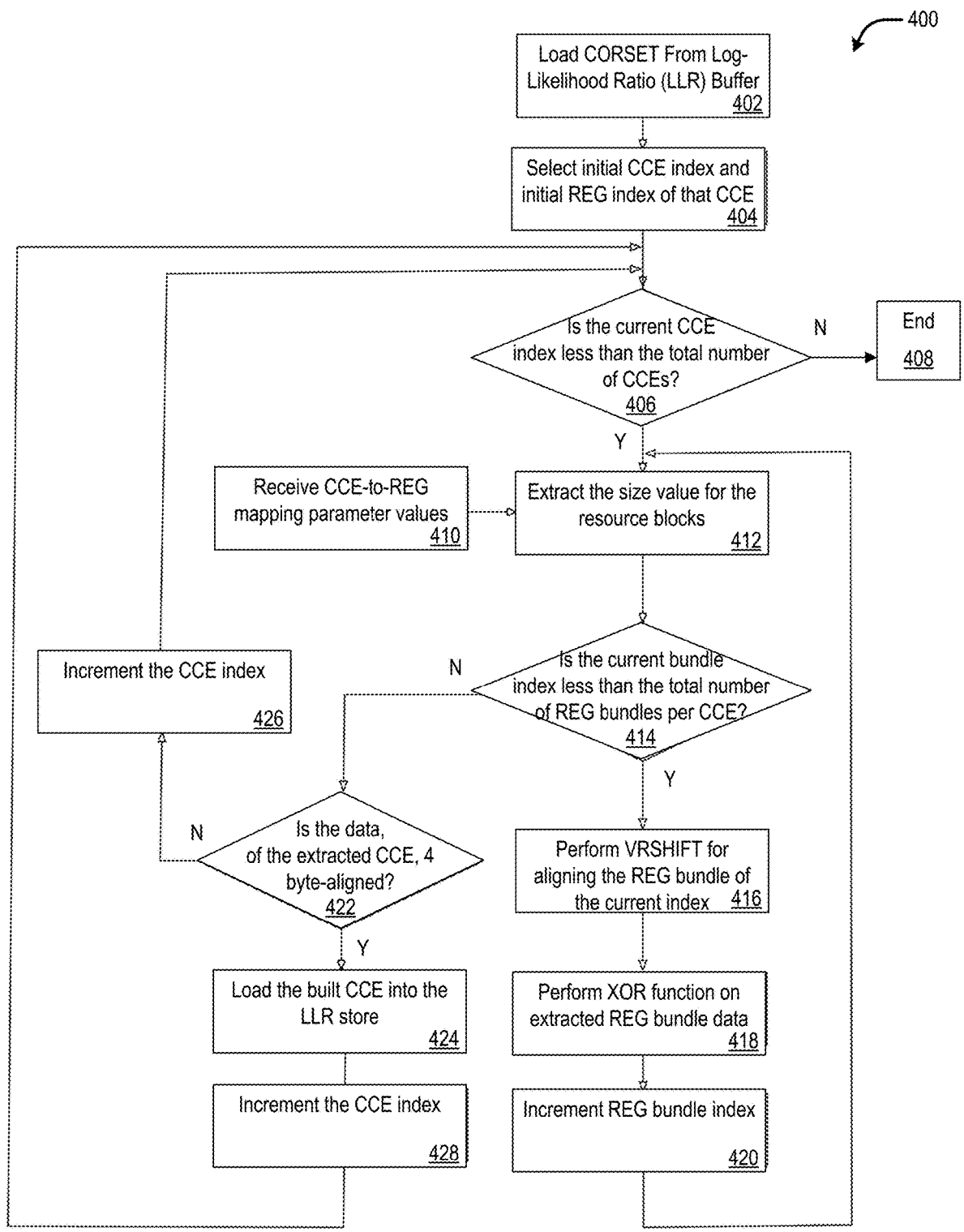
FIG. 4 illustrates an example process for interleaved control channel element to resource element group mapping in accordance with some implementations of the present disclosure.

FIG. 4 illustrates an example process 400 for a mapping of an interleaved control channel element to a resource element group. The mapping is performed in accordance with some implementations of the present disclosure. A base station (e.g., a node such as a next generation node gNB) is configured to generate the interleaved transmission. A UE (e.g., using a baseband processor or other portion thereof) is configured to perform process 400 to de-interleave the REGs and construct the CCEs in accordance with the CCE to REG mapping. The CCEs are built from bundles including 1, 2, 3, or 6 REGs per bundle. The bits per RB are based on the REG size (e.g., L). The duration is 1, 2, or 3. Process 400 is repeated for all CORESETs across all bandwidth parts to build all CCEs.

The UE is configured to load (402) the CORESET from a LLR data store. The CORESET is received from the base station in an interleaved format according to a CCE-to-REG mapping specified by the base station (e.g., in a RRC configuration message). The UE is configured to select (404) a CCE for de-interleave processing. The selected CCE can be any CCE. The UE selects a CCE by selecting a particular index value of the REG in the CORESET, and then assigning that REG to a first CCE based on the location of the REG in the CORESET. The index value corresponds to the frequency band occupied by the REG(s). For example, REG 0 is at PRB frequency $f_0$. For a 2 OFDM symbol CORESET, REG 0 and REG 1 correspond to $f_0$, and so forth. Because the REG size, REG bundle size, number of REGs in the CORESET, and interleaver size are determined by the UE in process 400, the data processing system of the UE is configured to map each REG to the corresponding REG bundle including that REG.

The data processing system of the UE determines (406) if there are additional CCEs to process. If the number of built CCEs matches the total number in the CORSET, the process ends (408). If there are additional CCEs to build, the process continues.

The data processing system of the UE receives (410) the CCE-to-REG mapping parameter values, including REG size, REG bundle size, number of REGs in the CORESET, and interleaver size, as previously described.

The data processing system of the UE is configured to extract (412) a value of the size of the RBs from the received mapping data. The REG size is the block size which is defined as the number of PDCCH bits per RB*L per duration.

The data processing system of the UE determines (414) whether a current bundle index being at which RBs are being extracted is less than the total number of REG bundles per CCE. If the REG bundle index is less than the total number of REG bundles in the CCE, the data processing system of the UE is configured to perform (416) a VRSHIFT function on the REG bundle having the current index value to align the extracted data to enable the extracted data to be aggregated (e.g., by an XOR function). The data processing system of the UE is configured to perform (418) an XOR function on the extracted REG bundle and any other extracted REG bundles for the current CCE index to aggregate each of the extracted REG blocks into a single register.

Generally, the register-shifting function (VRSHIFT) and the "either but not both" combination function (XOR) are performed to align the extracted data of the REG bundles into a single data vector (e.g., from multiple registers). The VRSHIFT function enables alignment of the REG blocks in vector storage for concatenation by the XOR function. Specifically, each extraction (e.g., vector extraction (VEXT)) is performed to extract the vector value, the result is stored in a vector register file (VRF). Each extraction is performed based on the REG block size. In other words, the VEXT function is applied for a length of the REG block size to extract the specific REG block into each VRF. As previously stated, the REG block size can be different in different scenarios. Each line includes a number of registers, and each register holds 32bits (4 bytes). To aggregate the extracted REG blocks and have them in one line and also adjacent, the VRSHIFT and the XOR functions are applied as summarized in Table 1. Intermediate results are omitted for clarity.

TABLE 1

| VRSHIFT and VXOR in the de-interleave flow | | | |
|---|---|---|---|
| Memory | Register 0 | Register 1 | Register 2 |
| Vector Register File (VRF) 0 | $F_0$ | | |
| VRF 1 (VRSHIFT) alignment | | $F_1$ | |
| VRF 2 (VRSHIFT) alignment | | | $F_2$ |
| VRF 3 (XOR) *2 aggregation | $F_0$ | $F_1$ | $F_2$ |

The data processing system is configured to increment (420) to the next bundle index and repeat the extraction VEXT, alignment VRSHIFT, and aggregation XOR functions until the entire CCE is built. Once the CCE is built from all the REG bundles for that CCE, the data processing system determines (422) whether the extracted CCE is 4-byte aligned in memory. The CCE is 4-byte aligned in memory when a number of bytes of the CCE is a multiple of 4 so that the CCE occupies aligns with a vector store (VSW), which stores multiples of 4 bytes, whereas the REGs are 18 bytes. If the CCE is 4 byte-aligned, the data processing system loads (424) the built CCE into the LLR store without further extracting an additional CCE from the interleaved data. The data processing system then increments (428) the CCE index to repeat the process of building another CCE, if there is an additional CCE in the CORESET. If the data of the extracted CCE is not 4 byte-aligned, the data processing system is configured to build another CCE and append it to the first CCE. The second CCE is built using steps 406, 408, 410, 412, 414, 416, 418, and 420. When the second CCE is built, the data of the first and second CCEs is byte-aligned with a 4 byte block in memory. Generally, there are 18 LLRs per CCE. Because each LLR is 6 bits, the REG blocks are not each byte-aligned. Here, 4-byte-alignment refers to the CCE data being aligned with a 4 byte block of memory (e.g., a double-word alignment). If the CCE is not aligned with a byte, the second CCE is appended to achieve alignment with a 4-byte memory block. Process 400 is generally repeated for all CORSETs across all bandwidth parts.

The mapping process 400 of FIG. 4 is flexible to enable hardware acceleration of the UE for the de-interleaving process. In an example, the interleaved mapping calculation is performed in firmware because the mapping can be done per semi-static (re)configuration of the UE. The processor (e.g., a baseband processor) of the UE is configured to access LLR data stored in Layer 1 memory using a vector load (VLW) function that follows the mapping pattern. Specifically, the VLW loads from L1 memory to VRF, VSW stores from VRF to L1 memory.

A vector-intrinsic mode is used by the processor to indirectly access the LLR data. In the vector mode, the processor performs the memory copy and permutation commands on the extracted LLR data, and then returns the LLR data to the L1 memory. Because using the vector mode to extract LLR data consumes excess processing cycles (e.g., includes a substantial processing bandwidth overhead), the LLRs are provided along with the interleaved mapping from the base station. The UE then produces de-interleaved LLRs during process 400.

The de-interleaving process is challenging for memory writes because the RBs that are consecutive in memory are C number of RBs apart in the de-interleaved data. To write the data, the entire store can be loaded into memory before generating the de-interleaved output. To enable memory re-use, the processor generates the de-interleaved output in chunks, and therefore the de-interleaving process can operate incrementally. In some implementations, a specialized processing unit is hardware adapted to perform the de-interleaving process as previously described.

Figure 5A:
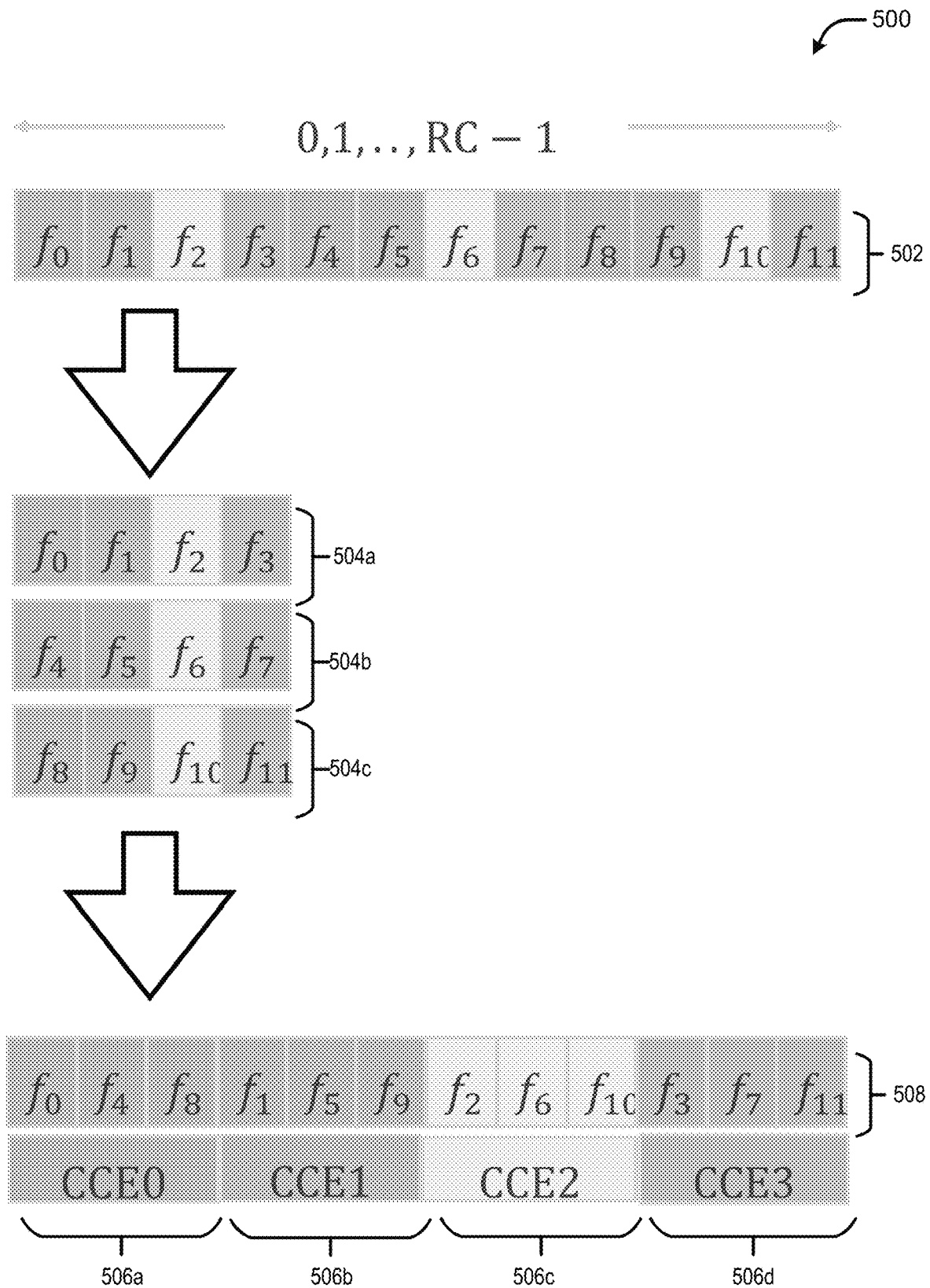
FIG. 5A illustrates an example representation of generating CCEs from interleaved REGs.
Figure 5B:
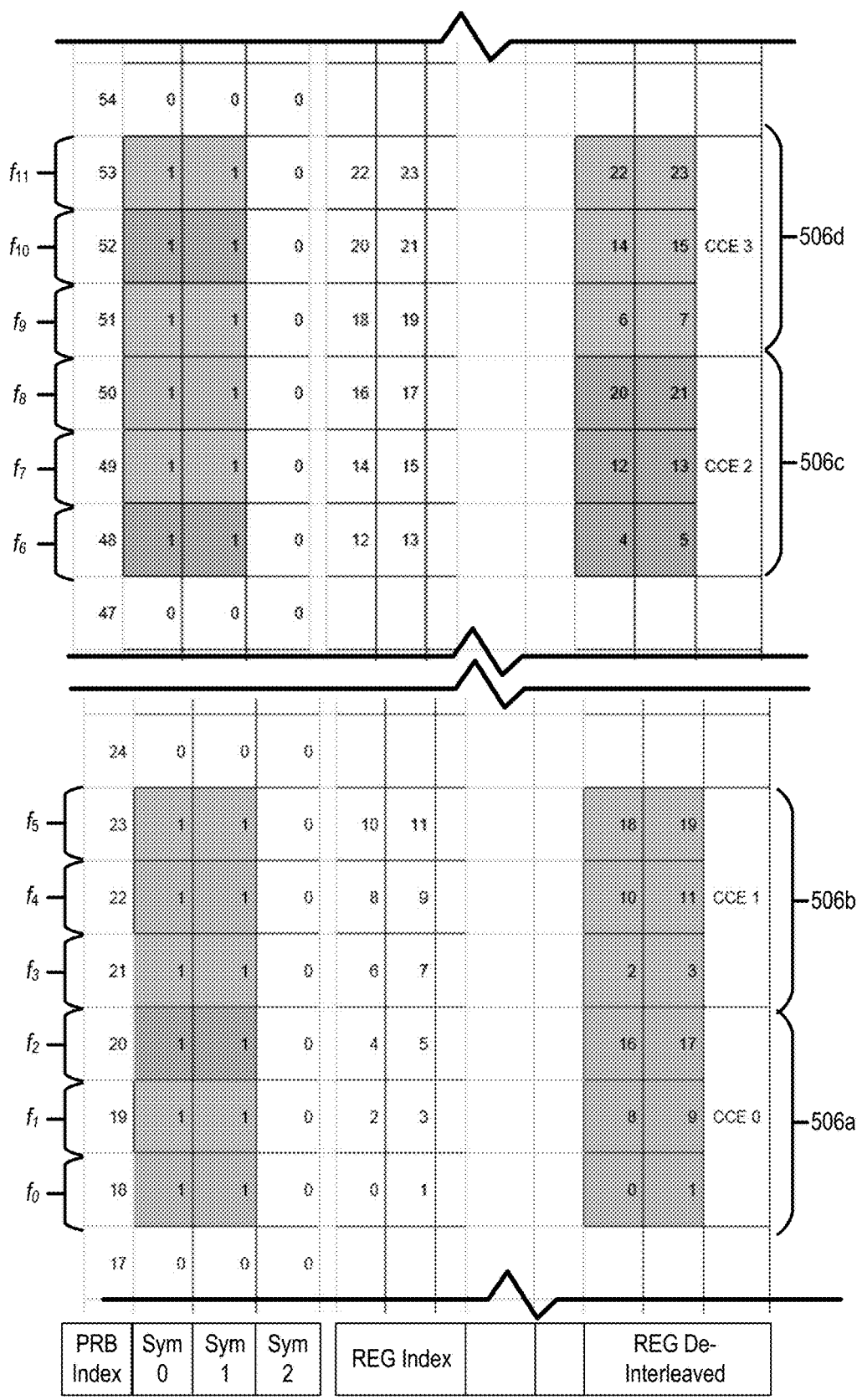
FIG. 5B illustrates an example representation of generating CCEs from interleaved REGs.

FIGS. 5A-5C illustrate an example representation of generating CCEs from interleaved REGs. FIG. 5A shows an example of individual RBs 502 being interleaved for generating four CCEs ($CCE_0$, $CCE_1$, $CCE_2$, and $CCE_3$). For this example, the de-interleave parameters are as follows. $N^{CORSET}_{RB}=12$. $N^{CORESET}_{sym}=2$. $N^{CORESET}_{REG}=24$. The shift size n_shift is 0. The REG bundle size L is 2. The interleaver size R is 3. The spacing between RBs in memory for interleaved units C is 4. FIG. 5C shows the mapping table 530 generated from these parameter values.

In FIG. 5A, each index (e.g., $f_0, f_1, f_2 \ldots$) represents a REG bundle (e.g., for a PRB). Specifically, $f_0$ represents REG indexes 0 and 1, and are extracted from PRB index 18. $f_1$ represents REG indexes 2 and 3, and are extracted from PRB index 19. $f_2$ represents REG indexes 4 and 5, and are extracted from PRB index 20. $f_3$ represents REG indexes 6 and 7, and are extracted from PRB index 21. The PRB indexes of each of $f_4$-$f_{11}$ are shown in FIG. 5B. The processor of the UE is configured to de-interleave one dimension (e.g., 1 symbol at a time).

As shown in FIG. 5B, to construct $CCE_0$, shown as 506a, the UE is configured to extract REGs 0, 8, and 16 for symbol 0 and REGs 1, 9, and 17 for symbol 1. To construct $CCE_1$, shown as 506b, the UE is configured to extract REGs 2, 10, and 18 for symbol 0 and REGs 3, 11, and 19 for symbol 1. To construct $CCE_2$, shown as 506c, the UE is configured to extract REGs 4, 12, and 20 for symbol 0 and REGs 5, 13, and 21 for symbol 1. To construct $CCE_3$, shown as 506d, the UE is configured to extract REGs 6, 14, and 22 for symbol 0 and REGs 7, 15, and 23 for symbol 1. In this case, neither one REG at a time nor one CCE can be stored at a time because neither is 4 byte aligned, as described previously. As previously described, a second de-interleaved result is extracted for loading into the destination register to obtain 4-byte alignment.

Figure 6:
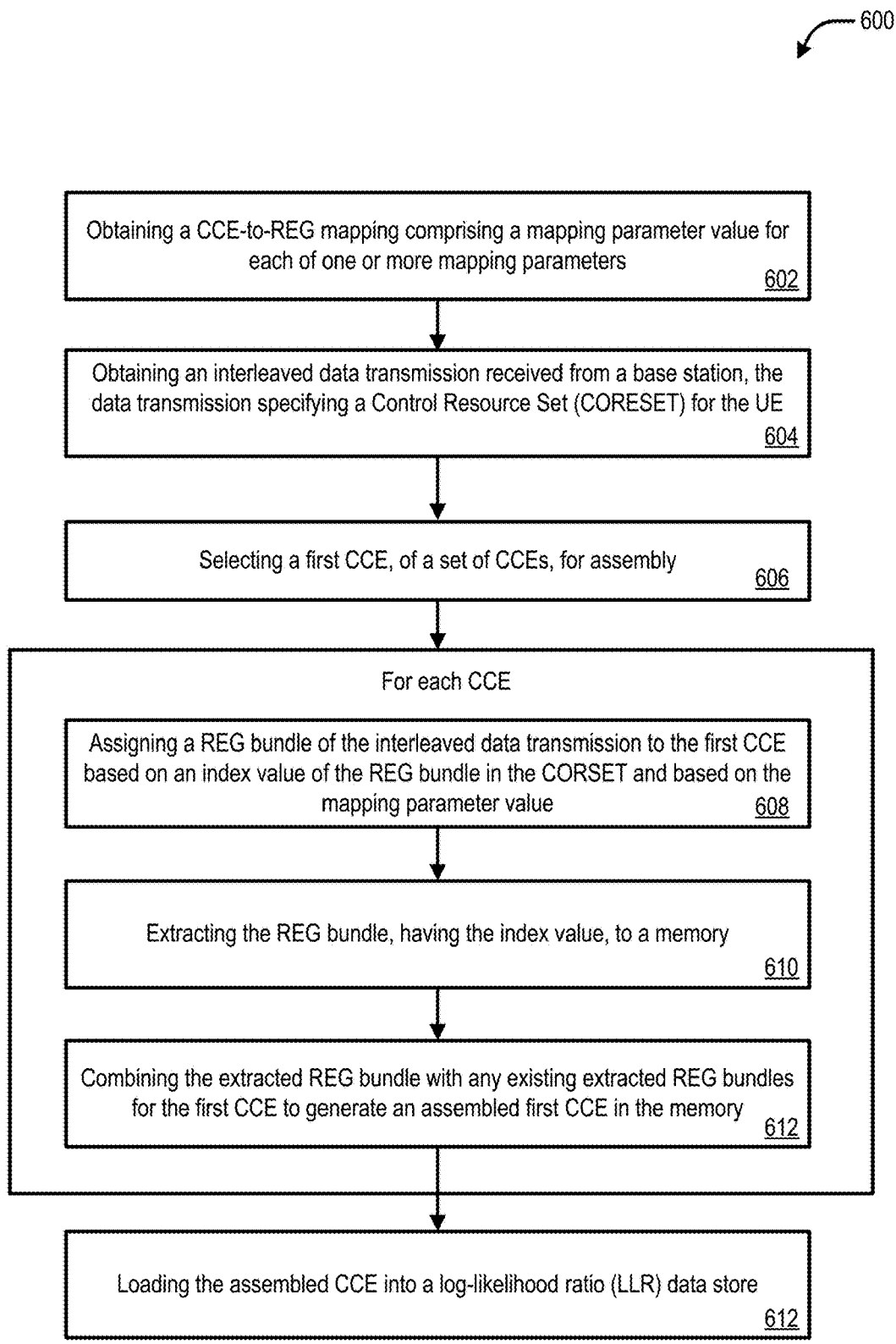
FIG. 6 illustrates an example process for interleaved control channel element to resource element group mapping in accordance with some implementations of the present disclosure.

FIG. 6 illustrates an example process 600 for interleaved control channel element to resource element group mapping in accordance with some implementations of the present disclosure. In some implementations, the UEs can include the UEs 101a-b of FIGS. 1-2. In some implementations, the base station includes the nodes 111a-b or network 120 as described in relation to FIGS. 1-5. The process 600 can be performed by the UE. The process 600 includes obtaining (602) a CCE-to-REG mapping comprising a mapping parameter value for each of one or more mapping parameters. The process 600 includes obtaining (604) an interleaved data transmission received from a base station, the data transmission specifying a Control Resource Set (CORESET) for the UE. The process 600 includes selecting (606) a first CCE, of a set of CCEs, for assembly. The process 600 includes assigning (608), for the first CCE, a REG bundle of the interleaved data transmission to the first CCE based on an index value of the REG bundle in the CORSET and based on the mapping parameter value. The process 600 includes extracting (610), for the first CCE, the REG bundle having the index value, to a memory. The process 600 includes combining (612), for the first CCE, the extracted REG bundle with any existing extracted REG bundles for the first CCE to generate an assembled first CCE in the memory. The process 600 includes loading (614) the assembled CCE into a log-likelihood ratio (LLR) data store.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

EXAMPLES

In the following sections, further exemplary embodiments are provided.

Example 1 includes a user equipment (UE) for de-interleaving a data of a plurality of Resource Element Groups (REGs) and construct one or more control channel elements (CCEs) in accordance with a CCE to REG mapping, the UE comprising: one or more processors; and memory storing instructions that, when executed by the one or more processors, cause the one or more processors to perform operations comprising: obtaining a CCE-to-REG mapping comprising a mapping parameter value for each of one or more mapping parameters; obtaining an interleaved data transmission received from a base station, the data transmission specifying a Control Resource Set (CORESET) for the UE; selecting a first CCE, of a set of CCEs, for assembly; for the first CCE: assigning a REG bundle of the interleaved data transmission to the first CCE based on an index value of the REG bundle in the CORSET and based on the mapping parameter value; extracting the REG bundle having the index value, to a memory; and combining the extracted REG bundle with any existing extracted REG bundles for the first CCE to generate an assembled first CCE in the memory; and loading the assembled first CCE into a data store.

Example 2 includes the UE of example 1 or some other example herein, wherein extracting the REG bundle comprises: determining a REG block size for data of the REG bundle; and applying a vector extraction (VEXT) based on the REG block size to extract the REG bundle.

Example 3 includes the UE of examples 1-2 or some other example herein, wherein extracting the REG bundle to the memory comprises: aligning each extracted REG bundle in a respective line of the memory; and aggregating the aligned REG bundles in the memory to generate the assembled CCE.

Example 4 includes the UE of examples 1-3 or some other example herein, wherein combining the extracted REG bundle with any existing extracted REG bundles for the first CCE to generate an assembled first CCE in the memory comprises: determining that one or more REG bundles are loaded into respective portions in the memory; and performing an XOR function on the one or more REG bundles at the respective portions of the memory and the extracted REG bundle in the memory to co-locate the REG bundles in a single vector file in the memory.

Example 5 includes the UE of examples 1-4 or some other example herein, the operations further comprising: determining if the assembled first CCE is four byte aligned in the register so that the assembled first CCE occupies one or more registers of the memory without occupying any partial registers of the memory; in response to determining that that the assembled first CCE is four byte-aligned, loading the assembled first CCE into the data store; in response to determining that the assembled first CCE is not four byte-aligned, incrementing a CCE index to specify a second CCE for assembling the second CCE; assembling the second CCE; and appending the assembled second CCE to the assembled first CCE.

Example 6 includes the UE of examples 1-5 or some other example herein, the operations further comprising: determining that the index value of the REG bundle in the CORESET is less than a total number of REG bundles per CCE; and incrementing to a second REG bundle having a second index value for extracting the second REG bundle, having the second index value, to the memory, wherein the first assembled CCE comprises the REG bundle and the second REG bundle.

Example 7 includes the UE of examples 1-6 or some other example herein, wherein the index value of the REG corresponds to a frequency band occupied by the REG.

Example 8 includes the UE of examples 1-7 or some other example herein, the operations further comprising receiving the CCE-to-REG mapping from the base station in a Radio Resource Configuration (RRC) message.

Example 9 includes the UE of examples 1-8 or some other example herein, wherein the mapping parameters of the CCE-to-REG mapping comprise at least one of a REG size, a REG bundle size, a number of REGs in the CORESET, and an interleaver size.

Example 10 includes the UE of examples 1-9 or some other example herein, wherein the data store comprises a log-likelihood ratio (LLR) data store.

Example 11 includes the UE of examples 1-10 or some other example herein, wherein the memory is a layer 1 (L1) register.

Example 12 includes the UE of examples 1-11 or some other example herein, wherein the REG bundle size is selected from 1, 2, 3, or 6 REGs per REG bundle.

Example 13 includes a baseband processor for de-interleaving a data of a plurality of Resource Element Groups (REGs) and construct one or more control channel elements (CCEs) in accordance with a CCE to REG mapping, the UE comprising: a processor; and memory storing instructions that, when executed by the processor, cause the processor to perform operations comprising: obtaining a CCE-to-REG mapping comprising a mapping parameter value for each of one or more mapping parameters; obtaining an interleaved data transmission received from a base station, the data transmission specifying a Control Resource Set (CORESET) for the UE; selecting a first CCE, of a set of CCEs, for assembly; for the first CCE: assigning a REG bundle of the interleaved data transmission to the first CCE based on an index value of the REG bundle in the CORSET and based on the mapping parameter value; extracting the REG bundle having the index value, to a memory; and combining the extracted REG bundle with any existing extracted REG bundles for the first CCE to generate an assembled first CCE in the memory; and loading the assembled first CCE into a data store.

Example 14 includes the baseband processor of example 13 or some other example herein, wherein extracting the REG bundle comprises: determining a REG block size for data of the REG bundle; and applying a vector extraction (VEXT) based on the REG block size to extract the REG bundle.

Example 15 includes the baseband processor of examples 13-14 or some other example herein, wherein extracting the REG bundle to the memory comprises: aligning each extracted REG bundle in a respective line of the memory; and aggregating the aligned REG bundles in the memory to generate the assembled CCE.

Example 16 includes the baseband processor of examples 13-15 or some other example herein, wherein combining the extracted REG bundle with any existing extracted REG bundles for the first CCE to generate an assembled first CCE in the memory comprises: determining that one or more REG bundles are loaded into respective portions in the memory; and performing an XOR function on the one or more REG bundles at the respective portions of the memory and the extracted REG bundle in the memory to co-locate the REG bundles in a single vector file in the memory.

Example 17 includes the baseband processor of examples 13-16 or some other example herein, the operations further comprising: determining if the assembled first CCE is four byte aligned in the register so that the assembled first CCE occupies one or more registers of the memory without occupying any partial registers of the memory; in response to determining that that the assembled first CCE is four byte-aligned, loading the assembled first CCE into the data store; in response to determining that the assembled first CCE is not four byte-aligned, incrementing a CCE index to specify a second CCE for assembling the second CCE; assembling the second CCE; and appending the assembled second CCE to the assembled first CCE.

Example 18 includes the baseband processor of examples 13-17 or some other example herein, the operations further comprising: determining that the index value of the REG bundle in the CORESET is less than a total number of REG bundles per CCE; and incrementing to a second REG bundle having a second index value for extracting the second REG bundle, having the second index value, to the memory, wherein the first assembled CCE comprises the REG bundle and the second REG bundle.

Example 19 includes the baseband processor of examples 13-18 or some other example herein, wherein the index value of the REG corresponds to a frequency band occupied by the REG.

Example 20 includes the baseband processor of examples 13-19 or some other example herein, the operations further comprising receiving the CCE-to-REG mapping from the base station in a Radio Resource Configuration (RRC) message.

Example 21 may include a signal as described in or related to any of examples 1-52, or portions or parts thereof.

Example 22 may include a datagram, information element, packet, frame, segment, PDU, or message as described in or related to any of examples 1-52, or portions or parts thereof, or otherwise described in the present disclosure.

Example 23 may include a signal encoded with data as described in or related to any of examples 1-22, or portions or parts thereof, or otherwise described in the present disclosure.

Example 24 may include a signal encoded with a datagram, IE, packet, frame, segment, PDU, or message as described in or related to any of examples 1-23, or portions or parts thereof, or otherwise described in the present disclosure.

Example 25 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 26 may include a computer program comprising instructions, wherein execution of the program by a processing element is to cause the processing element to carry out the method, techniques, or process as described in or related to any of examples 1-25, or portions thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

What is claimed is:

1. A user equipment (UE) for de-interleaving a data of a plurality of Resource Element Groups (REGs) and construct one or more control Channel elements (CCEs) in accordance with a CCE to REG mapping, the UE comprising:
   one or more processors; and
   memory storing instructions that, when executed by the one or more processors, cause the one or more processors to perform operations comprising:
      obtaining a CCE-to-REG mapping comprising a mapping parameter value for each of one or more mapping parameters;
      obtaining an interleaved data transmission received from a base station, the data transmission specifying a Control Resource Set (CORESET) for the UE;
      selecting a first CCE, of a set of CCEs, for assembly;
      for the first CCE:
         assigning a REG bundle of the interleaved data transmission to the first CCE based on an index value of the REG bundle in the CORESET and based on the mapping parameter value;
         extracting the REG bundle having the index value, to a memory; and
         combining the extracted REG bundle with any existing extracted REG bundles for the first CCE to generate an assembled first CCE in the memory; and
         loading the assembled first CCE into a data store.

2. The UE of claim 1, wherein extracting the REG bundle comprises:
   determining a REG block size for data of the REG bundle; and
   applying a vector extraction (VEXT) based on the REG block size to extract the REG bundle.

3. The UE of claim 2, wherein extracting the REG bundle to the memory comprises:
   aligning each extracted REG bundle in a respective line of the memory; and
   aggregating the aligned REG bundles in the memory to generate the assembled CCE.

4. The UE of claim 1, wherein combining the extracted REG bundle with any existing extracted REG bundles for the first CCE to generate an assembled first CCE in the memory comprises:
   determining that one or more REG bundles are loaded into respective portions in the memory; and
   performing an XOR function on the one or more REG bundles at the respective portions of the memory and the extracted REG bundle in the memory to co-locate the REG bundles in a single vector file in the memory.

5. The UE of claim 1, the operations further comprising:
   determining if the assembled first CCE is four byte aligned in a register so that the assembled first CCE occupies one or more registers of the memory without occupying any partial registers of the memory;
   in response to determining that that the assembled first CCE is four byte-aligned, loading the assembled first CCE into the data store;
   in response to determining that the assembled first CCE is not four byte-aligned, incrementing a CCE index to specify a second CCE for assembling the second CCE;
   assembling the second CCE; and
   appending the assembled second CCE to the assembled first CCE.

6. The UE of claim 1, the operations further comprising:
   determining that the index value of the REG bundle in the CORESET is less than a total number of REG bundles per CCE; and
   incrementing to a second REG bundle having a second index value for extracting the second REG bundle, having the second index value, to the memory,
   wherein the first assembled CCE comprises the REG bundle and the second REG bundle.

7. The UE of claim 1, wherein the index value of the REG corresponds to a frequency band occupied by the REG.

8. The UE of claim 1, the operations further comprising receiving the CCE-to-REG mapping from the base station in a Radio Resource Configuration (RRC) message.

9. The UE of claim 1, wherein the mapping parameters of the CCE-to-REG mapping comprise at least one of a REG size, a REG bundle size, a number of REGs in the CORESET, and an interleaver size.

10. The UE of claim 1, wherein the data store comprises a log-likelihood ratio (LLR) data store.

11. The UE of claim 1, wherein the memory is a layer 1 (L1) register.

12. The UE of claim 1, wherein the REG bundle size is selected from 1, 2, 3, or 6 REGs per REG bundle.

13. A baseband processor for de-interleaving a data of a plurality of Resource Element Groups (REGs) and construct one or more control channel elements (CCEs) in accordance with a CCE to REG mapping, the baseband processor configured to perform operations comprising:
   obtaining a CCE-to-REG mapping comprising a mapping parameter value for each of one or more mapping parameters;
   obtaining an interleaved data transmission received from a base station, the data transmission specifying a Control Resource Set (CORESET);
   selecting a first CCE, of a set of CCEs, for assembly;
   for the first CCE:
      assigning a REG bundle of the interleaved data transmission to the first CCE based on an index value of the REG bundle in the CORESET and based on the mapping parameter value;

extracting the REG bundle having the index value, to a memory; and combining the extracted REG bundle with any existing extracted REG bundles for the first CCE to generate an assembled first CCE in the memory; and loading the assembled first CCE into a data store.

14. The baseband processor of claim 13, wherein extracting the REG bundle comprises:

determining a REG block size for data of the REG bundle; and applying a vector extraction (VEXT) based on the REG block size to extract the REG bundle.

15. The baseband processor of claim 14, wherein extracting the REG bundle to the memory comprises:

aligning each extracted REG bundle in a respective line of the memory; and aggregating the aligned REG bundles in the memory to generate the assembled CCE.

16. The baseband processor of claim 13, wherein combining the extracted REG bundle with any existing extracted REG bundles for the first CCE to generate an assembled first CCE in the memory comprises:

determining that one or more REG bundles are loaded into respective portions in the memory; and performing an XOR function on the one or more REG bundles at the respective portions of the memory and the extracted REG bundle in the memory to co-locate the REG bundles in a single vector file in the memory.

17. The baseband processor of claim 13, the operations further comprising:

determining if the assembled first CCE is four byte aligned in a register so that the assembled first CCE occupies one or more registers of the memory without occupying any partial registers of the memory;

in response to determining that that the assembled first CCE is four byte-aligned, loading the assembled first CCE into the data store;

in response to determining that the assembled first CCE is not four byte-aligned, incrementing a CCE index to specify a second CCE for assembling the second CCE;

assembling the second CCE; and appending the assembled second CCE to the assembled first CCE.

18. The baseband processor of claim 13, the operations further comprising:

determining that the index value of the REG bundle in the CORESET is less than a total number of REG bundles per CCE; and incrementing to a second REG bundle having a second index value for extracting the second REG bundle, having the second index value, to the memory, wherein the first assembled CCE comprises the REG bundle and the second REG bundle.

19. The baseband processor of claim 13, wherein the index value of the REG corresponds to a frequency band occupied by the REG.

20. The baseband processor of claim 13, the operations further comprising receiving the CCE-to-REG mapping from the base station in a Radio Resource Configuration (RRC) message.

* * * * *